United States Patent [19]

Anglaret et al.

[11] Patent Number: 4,602,754
[45] Date of Patent: * Jul. 29, 1986

[54] DEVICE FOR HOLDING PIPING TO A SUPPORT

[75] Inventors: Gilbert Anglaret, Le Chesnay; René Wolff, Le Vesinet; Michel Le Gallo, Creully; Jean-Louis Leroyer, Maltot, all of France

[73] Assignee: Framatome, Courbevoie, France

[*] Notice: The portion of the term of this patent subsequent to Dec. 4, 2001 has been disclaimed.

[21] Appl. No.: 260,851

[22] Filed: May 6, 1981

[30] Foreign Application Priority Data

May 29, 1980 [FR] France ............................... 80 11949

[51] Int. Cl.⁴ ............................................. F16L 3/08
[52] U.S. Cl. ...................................... 248/65; 248/49; 248/DIG. 1
[58] Field of Search ............... 248/65, 73, 49, DIG. 1, 248/55; 285/61; 403/64, 175

[56] References Cited

U.S. PATENT DOCUMENTS

| 933,386 | 9/1909 | Neill | 403/175 |
| 2,195,336 | 3/1940 | Loop | 403/64 |
| 2,533,370 | 12/1950 | Haug | 248/55 |
| 3,278,950 | 10/1966 | Hutchins | 248/49 X |
| 4,083,156 | 4/1978 | Tye | 403/64 X |
| 4,343,497 | 8/1982 | Bot | 285/61 |
| 4,485,994 | 12/1984 | Anglaret et al. | 248/49 |

FOREIGN PATENT DOCUMENTS 2406869 5/1979 France .
2,472,129 6/1981 France .

Primary Examiner—Ramon O. Ramirez
Attorney, Agent, or Firm—Pollock, Vande Sande & Priddy

[57] ABSTRACT

The present invention relates to a device capable of holding a straight piping element to a strong support structure, taking up the radial forces applied to the piping and permitting slight axial movements due to expansion. The device permits piping to be attached to at least one anchoring base plate sealed to a strong structure and comprises a plurality of rectilinear coupling elements attached through articulations to the piping, joined to the anchoring base plate and arranged in a plurality of planes perpendicular to the axis of the piping each of which contains at least three of said coupling elements. It is essentially characterized by the fact that it comprises at least one annular collar whose bore forms at least one face parallel to the axis of the piping and applied against an outer bearing surface of the piping whose cross-section corresponds to that of said bore. This collar is connected, through said articulations, to said coupling elements in a plane perpendicular to the axis of the piping. Such a system is useful in a nuclear power station.

4 Claims, 2 Drawing Figures

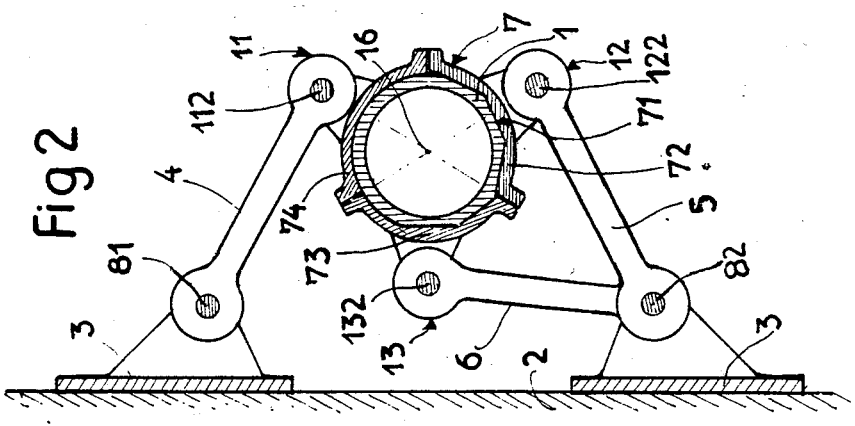
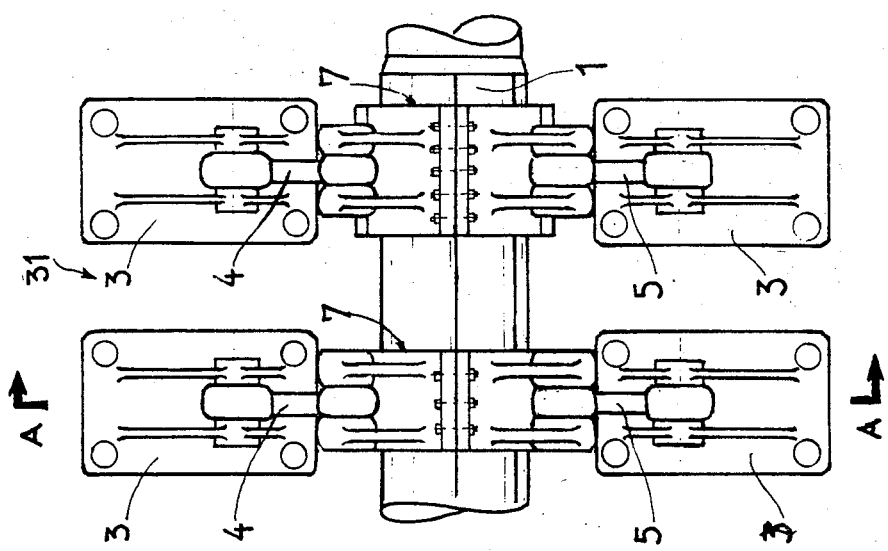

DEVICE FOR HOLDING PIPING TO A SUPPORT

FIELD OF THE INVENTION

The present invention relates to a device capable of holding a straight piping element to a strong structure taking up the radial forces applied to the piping while permitting slight axial movements due to expansion. It forms part of a combined system of radial outlet support for steam piping comprising in other respects a fixed fastening point for the piping. Such a system is used in a nuclear power station.

BACKGROUND OF THE INVENTION

There exist various types of devices for fastening piping to strong support structures. In French Patent Application No. 2,406,869, assigned to applicant, a straight piping element is fastened to square plates which are engaged between two slideways made fast to the fixed structure. In other respects the piping element is attached to the structure through two connecting rods positioned at a distance from the slideways and the associated square plates. Each of these connecting rods is articulated on the one hand to the piping element and on the other hand to the fixed structure. These connecting rods enable the forces parallel to the faces of the slideways to be taken up. If radial support in all directions is assured by the slideways and by the articulated connecting rods, on the other hand the arrangement of these elements, along the piping, generates forces at the level of the fastenings of these elements offset from the fixed structure.

It is an object of the present invention to provide a device for holding piping to a strong structure enabling the twisting or bending forces of the piping to be taken up in all possible directions.

It is another object of the invention to provide a device of a design which enables it to be adapted to large or small stresses.

It is another object of the invention to provide a device in which the thermal bridge, between the piping and the metal portions anchored to the support structure, is reduced to a minimum and the interuptions of heat insulation on the piping are limited.

It is a further object of the invention to provide a device which permits considerable temperature gradients due to the absence of guidance by pads, and which enables the anchorages to be kept on the strong supporting structure at an acceptable temperature level.

It is another object of the invention to provide a device whose assembly is simple and with very broad possibilities of adjustment.

It is a further object of the invention to provide a support device which also permits slight axial movements of the piping.

SUMMARY OF THE INVENTION

According to the invention there is provided a support device which enables piping to be attached to at least one anchoring base plate sealed to a strong support structure, and comprises a plurality of rectilinear coupling elements attached through articulations to the piping, joined to the anchoring base plate and arranged in a plurality of planes perpendicular to the axis of the piping which each contain at least two of said coupling elements and it is essentially characterized by the fact that it comprises at least one annular collar whose bore forms at least one face parallel to the axis of the piping and applied against an external bearing surface of the piping whose cross-section corresponds with that of said bore, this collar being connected, through said articulations, to said coupling elements in a plane perpendicular to the axis of the piping.

According to a feature of the invention, each plane perpendicular to the axis of the piping contains three of said coupling elements, the collar being in several parts joined to one another.

According to another feature, the articulations to the piping of the coupling elements of a same plane perpendicular to the axis of the piping are situated at 120° with respect to one another, the collar being in three parts.

BRIEF DESCRIPTION OF THE DRAWINGS

The invention will now be described in more detail with reference to a particular embodiment given purely by way of example and shown in the accompanying drawings.

In the drawings:

FIG. 1 is a general view of a support device according to the invention.

FIG. 2 shows a section along the line of A—A of FIG. 1.

DETAILED DESCRIPTION OF A PARTICULAR EMBODIMENT

The device according to the invention is integrated into a combined support system such as that described in French Patent Application No. 2,472,129.

In FIG. 1, the piping is held to the strong supporting structure through an anchoring base plate 3. This base plate is in several separate elements. It is anchored to the structure 2 by means, for example, of prestressed sealing tie-rods.

The piping 1 is connected to the anchoring base plate 3 through coupling elements 4, 5, 6. Each coupling element is rectilinear in the manner of a connecting rod. It is connected at its ends, through two articulations, on the one hand to the piping, on the other hand to the base plate. The coupling elements 4 are connected through the articulations 11 to the piping and through the articulations 81 to the base plate. The coupling elements 5 are connected through the articulations 12 to the piping and through the articulations 82 to the base plate. The coupling elements 6 are connected through the articulation 13 to the piping and through the articulations 82 to the base plate.

The longitudinal axes of the coupling elements are arranged in a plurality of planes perpendicular to the axis 16 of the piping. Each plane contains three coupling elements. Thus the plane A—A contains three coupling elements 4, 5, 6.

The coupling elements 4 are spaced in a plane parallel to the axis of the piping while being perpendicular to this axis. In the same way the coupling elements 5 or 6 are spaced in planes parallel to the axis of the piping while being perpendicular to this axis.

The longitudinal axes of the coupling elements in a given plane perpendicular to the axis of the piping are arranged outside of the piping along the sides of a triangle. The three coupling elements 4, 5, 6 in a given plane are articulated to the base plate through two articulations only, the coupling elements 5 and 6 having a common articulation axis. The articulations 81 and 82 of the coupling elements to the base plate are ball joint articulations. These types of articulation are necessary to permit expansion movements of the piping along the axis 16. Each coupling element 4 is articulated to a block 3 through an articulation axis 81 and a ball joint. Each coupling element 5 is articulated with a coupling element 6 with a double block 3 through a common articulation axis 82 and a ball joint.

The articulation axes 81 and 82 are parallel to the axis of the piping. The articulations 11, 12, 13 are ball joint articulations, each comprising an axle 112, 122, 132 respectively, which is parallel to the piping and a ball joint. The axles are borne by annular collars 7. Each collar comprises a bore forming at least one face 71 which is flat and parallel to the axis 16. This collar engirdles the piping. The latter comprises an outer bearing surface having at least one face parallel to the axis 16 so that this bearing surface is not a cylindrical surface of revolution. The cross-section of the bore of the collar corresponds to the outer cross-section of the bearing surface of the piping. Each collar is gripped by clamping to the bearing surface of the piping. It is connected through articulations 11, 12, 13 to the coupling elements 4, 5, 6.

The collar is formed of several parts 72, 73, 74 which are bolted to one another. The articulations 11, 12, 13 of the coupling elements in a given plane perpendicular to the axis of the piping are three in number and are situated at 120° with respect to one another. The collar is thus in three parts, each part being connected through an articulation to a coupling element.

Preferably, the bearing surface of the piping is a prismatic surface or a partially prismatic and cylindrical surface.

The various articulation axes 81 of the coupling elements 4 are parallel to the axis of the piping element. In the same way the various articulation axes 82 of the coupling elements 5 and 6 are parallel to the axis of the piping. The longitudinal axis of each coupling element passes through an axis 112, 122, 132 and through an articulation axis 81 or 82 on the base plate. The longitudinal axes of the three coupling elements 4, 5, 6 are arranged along the three sides of an imaginary triangle of which one of the apices is occupied by the articulation axis 82. Preferably the coupling elements 4, 5, 6 are of equal length. The longitudinal axes of the coupling elements in a given plane perpendicular to the piping axis are in converging pairs.

The invention is not limited to the embodiment which has just been described. In particular the annular collar can be provided for use in a support device which comprises a support stop fast to the strong support structure and in contact through a sliding surface with a buffer fast to the piping, and at least four coupling elements distributed in pairs in planes perpendicular to the axis of the piping, two of which are situated on each side of the stop and of the buffer. Such a device is described in French Patent Application No. 79-31401.

What is claimed is:

1. Device for holding piping to at least one anchoring base plate sealed to a support structure, wherein said piping has an outer bearing surface provided with at least one substantially planar face parallel to the axis of said piping and is engirdled by at least one annular collar whose bore is also provided with at least one substantially planar face parallel with said axis, so that the cross-section of said outer bearing surface of said piping corresponds to that of said bore, said collar being connected, through articulations, to at least two rectilinear elements which extend in a plane perpendicular to the axis of said piping and are joined by articulations to said anchoring base plate.

2. Device according to claim 1, wherein each plane perpendicular to the axis of said piping contains three of said coupling elements which are arranged along the three sides of an imaginary triangle, two of said coupling elements being articulated on a common articulation axis on said support structure.

3. Device according to claim 1 or 2, wherein at least part of said bearing surface and said bore form a prismatic surface.

4. Device according to claim 1 or 2, wherein the articulations to said piping of said coupling elements in a given plane perpendicular to the axis of said piping are situated at 120° with respect to one another, and wherein the collar comprises three parts joined to one another.

* * * * *